United States Patent
Kodama et al.

(10) Patent No.: US 11,493,007 B2
(45) Date of Patent: Nov. 8, 2022

(54) ENGINE AIR INTAKE DEVICE

(71) Applicant: MAZDA MOTOR CORPORATION, Hiroshima (JP)

(72) Inventors: Shin Kodama, Aki-gun (JP); Kenji Sugasaki, Aki-gun (JP); Hiromasa Nakagawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/274,023

(22) PCT Filed: Sep. 3, 2019

(86) PCT No.: PCT/JP2019/034607
§ 371 (c)(1),
(2) Date: Mar. 5, 2021

(87) PCT Pub. No.: WO2020/054513
PCT Pub. Date: Mar. 19, 2020

(65) Prior Publication Data
US 2021/0340940 A1 Nov. 4, 2021

(30) Foreign Application Priority Data
Sep. 11, 2018 (JP) .............................. JP2018-169783

(51) Int. Cl.
*F02M 35/10* (2006.01)
*F02M 35/16* (2006.01)

(52) U.S. Cl.
CPC ............. *F02M 35/10144* (2013.01); *F02M 35/10288* (2013.01); *F02M 35/161* (2013.01); *F02M 35/10157* (2013.01)

(58) Field of Classification Search
CPC ....... F02M 35/10144; F02M 35/10288; F02M 35/161; F02M 35/10157
See application file for complete search history.

(56) References Cited

U.S. PATENT DOCUMENTS

| | | | |
|---|---|---|---|
| 7,237,541 B2* | 7/2007 | Vanderveen | F02M 35/1045 123/184.21 |
| 2007/0012276 A1 | 1/2007 | Ohara | |
| 2010/0170734 A1* | 7/2010 | Teraguchi | B60K 13/02 180/68.3 |
| 2016/0032875 A1* | 2/2016 | Seo | F02M 35/10 123/184.21 |

(Continued)

FOREIGN PATENT DOCUMENTS

| | | | |
|---|---|---|---|
| EP | 2860384 A1 | 4/2015 | |
| EP | 3578403 A1 | 12/2019 | |

(Continued)

*Primary Examiner* — Syed O Hasan
(74) *Attorney, Agent, or Firm* — Alleman Hall Creasman & Tuttle LLP

(57) ABSTRACT

A cover covering an engine and an intake duct for introducing fresh air outside an engine room into a combustion chamber of the engine are provided in the engine room. The cover includes a top face cover portion covering the engine from above, and a side face cover portion covering the engine from the lateral side. The intake duct is disposed so as to be continuous to a side edge of the side face cover portion such that the intake duct covers the engine from the lateral side together with the side face cover portion.

9 Claims, 18 Drawing Sheets

(56) References Cited

U.S. PATENT DOCUMENTS

2019/0048779 A1   2/2019  Hoshino et al.

FOREIGN PATENT DOCUMENTS

| | | |
|---|---|---|
| FR | 3063466 A1 | 9/2018 |
| JP | H514535 U | 2/1993 |
| JP | 2563058 Y2 | 2/1998 |
| JP | 2009144524  * | 2/2009 |
| JP | 2009144524 A | 7/2009 |
| JP | 2017180210 A | 10/2017 |

* cited by examiner

ENGINE AIR INTAKE DEVICE

TECHNICAL FIELD

The present invention relates to an intake device for an engine.

BACKGROUND ART

It has been conventionally known that, in an engine room of a vehicle, an engine is covered with a cover member to keep the engine warm. For example, Patent Literature 1 discloses providing, in an engine room, a cylinder head-side thermal insulating cover composed of an upper wall covering a top face of an engine and a side wall covering both side faces of an upper portion of the engine in the vehicle width direction. The vehicle front side of the thermal insulating cover is supported on an upper end of a radiator shroud, and the vehicle rear side thereof is supported on a dash panel. Furthermore, Patent Literature 1 also discloses providing a cylinder block-side thermal insulating cover covering a face on the vehicle front side of a cylinder block, a face on the vehicle rear side of the cylinder block, both side faces of the cylinder block in the vehicle width direction, and substantially the entire oil pan.

CITATION LIST

Patent Literature

Patent Literature 1: Japanese Patent Laid-Open No. 2017-180210

SUMMARY OF INVENTION

Technical Problem

In a case where a cover member covering an engine is provided in an engine room, the layout of an intake duct leading fresh air to a combustion chamber of the engine becomes a problem. Normally, it is conceivable that an air cleaner is protruded outside the cover member and that the intake duct is disposed outside the cover member and connected to the air cleaner. It is recognized that Patent Literature 1 also adopts such a configuration. However, since the intake duct is disposed apart from the engine toward the outside of the cover member, it is difficult to secure a disposition space of the intake duct in the engine room, and in addition, normally, an intake passage also becomes long.

Thus, in a case where a cover covering an engine is provided as described above, the present invention suppresses outward spread of a space to be secured in an engine room for disposition of an intake duct, and also achieves shortening of an intake passage and downsizing of an intake device.

Solution to Problem

To solve the problem, in the present invention, an intake duct forms a part of a cover covering an engine from the lateral side.

An intake device for an engine disclosed herein has a cover provided inside an engine room and covering the engine, and an intake duct for introducing fresh air outside the engine room into a combustion chamber of the engine, wherein:

the cover includes a top face cover portion covering the engine from above, and a side face cover portion covering the engine from the lateral side, and
the intake device is characterized in that
the intake duct is disposed so as to be continuous to a side edge of the side face cover portion such that the intake duct covers the engine from the lateral side together with the side face cover portion.

According to this, the intake duct is continuous to the side edge of the side face cover portion, so that the intake duct approaches the engine as compared with a case where the intake duct is disposed outside the side face cover portion. This prevents an increase in a space occupied by, in the engine room, the cover and air intake system components including the intake duct, facilitating the layouts of the cover and the air intake system components in the engine room.

Furthermore, the intake duct can be caused to approach the engine, so that an intake passage is prevented from becoming long. The intake duct has a function of covering the engine from the lateral side so that the side face cover portion can be made small accordingly. By the shortening of the intake passage and the downsizing of the side face cover portion as described above, the device is advantageously reduced in weight.

In an embodiment, the engine room is provided in a front portion of a vehicle,
the engine is a front intake and rear exhaust engine, and
the intake duct is disposed so as to be continuous to a side edge on the front side of the side face cover portion.

In the front intake-type engine, the intake duct is disposed on the front side of the side face cover portion, so that it is advantageous in shortening the intake passage.

In an embodiment, the intake duct and the side face cover portion are coupled together by a fastening member. Thus, the intake duct can be used for support of the side face cover portion, which is advantageous in reducing the number of components and enhancing mounting stability of the side face cover portion.

In an embodiment, the fastening member is a clip having a retainer. Accordingly, coupling of the side face cover portion and the intake duct is facilitated.

Advantageous Effect of Invention

According to the present invention, in a case where the cover including the top face cover portion covering the engine from above and the side face cover portion covering the engine from the lateral side are provided in the engine room, the intake duct is disposed so as to be continuous to the side edge of the side face cover portion such that the intake duct covers the engine from the lateral side together with the side face cover portion, so that the layouts of the cover and the air intake system components in the engine room are facilitated, the shortening of the intake passage is achieved, and in addition, the device is advantageously reduced in weight.

DESCRIPTION OF EMBODIMENTS

Hereinafter, a mode for carrying out the present invention will be described based on the drawings. The following description of a preferred embodiment is merely illustrative in nature and is not intended to limit the present invention, applications thereof, or use thereof.

<Configurations of Engine and Peripherals>

Figure 1:
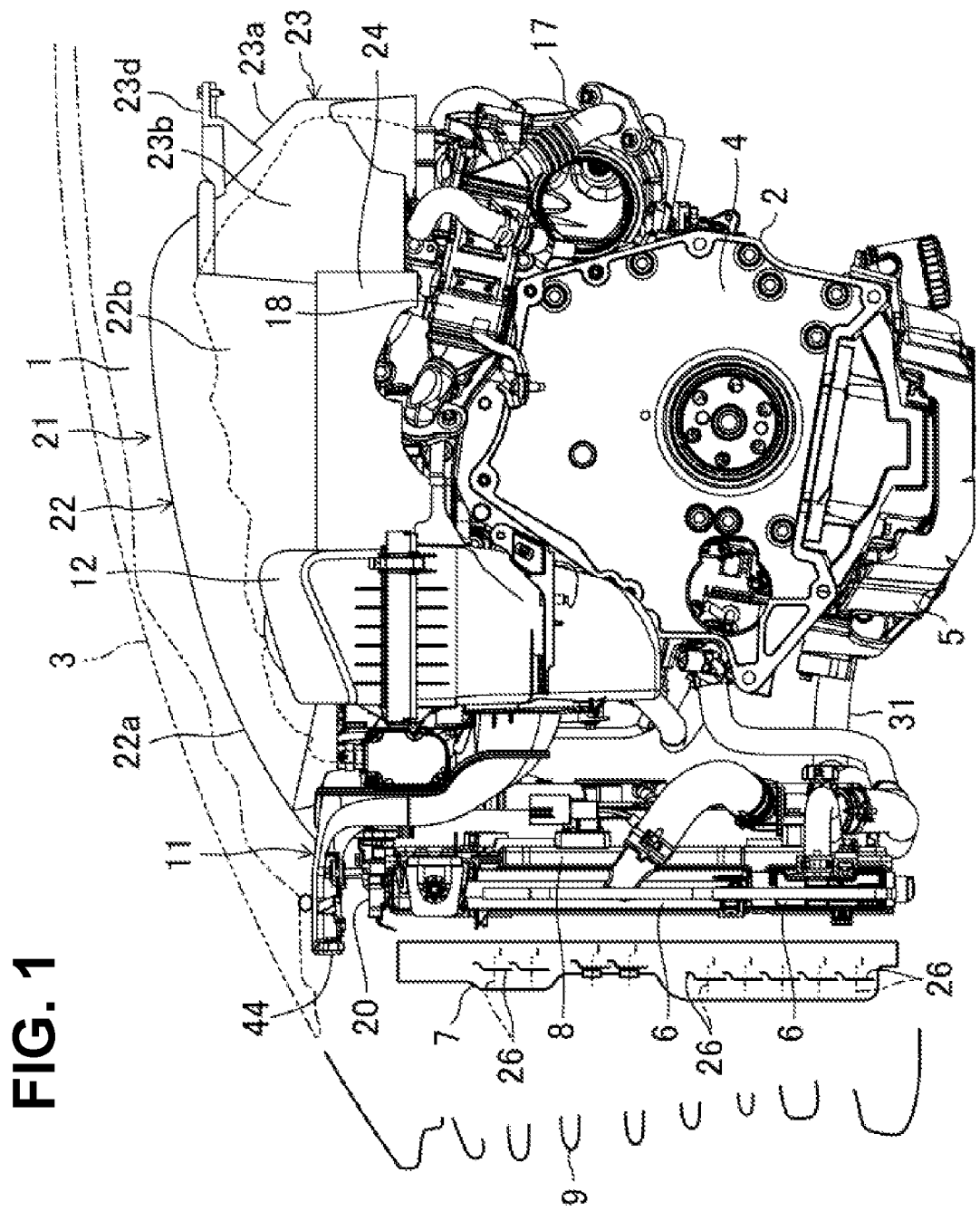
FIG. 1 is a right side view illustrating a state in which, inside an engine room including an intake device according to an embodiment of the present invention, an engine is covered with a heat storage cover.

FIG. 1 illustrates an inside of an engine room 1 including an intake device for an engine according to the present embodiment. The engine room 1 is provided as a recessed opening on the upper side in a vehicle front portion and accommodates an engine 2 and peripherals of the engine 2. The opening on the upper side of the engine room 1 is blocked by a bonnet 3. The bonnet 3 is openable and closable, so that the inside of the engine room 1 can be seen from the outside of a vehicle by opening the bonnet 3 as necessary.

Here, "the inside of the engine room 1" refers to a space defined when the opening on the upper side of the engine room 1 is blocked by closing the bonnet 3. In the present description, the advancing-receding direction of the vehicle is referred to as "the front-rear direction," the advancing side is referred to as "the front side," and the receding side is referred to as "the rear side." Furthermore, the vehicle width direction is referred to as "the left-right direction." Furthermore, "the right side" and "the left side" are when the vehicle is viewed from the front side.

The engine 2 includes a cylinder block 4 and a cylinder head placed on the cylinder block 4. An oil pan 5 is fixed to a bottom face of the cylinder block 4. Although not illustrated, a plurality of cylinders are formed inside the cylinder block 4. That is, the engine 2 is a multi-cylinder engine. A piston is slidably inserted into each cylinder. The piston is connected to a crankshaft via a connecting rod. The piston defines a combustion chamber of the engine 2 together with the cylinder and the cylinder head.

Fresh air is introduced into the combustion chamber of the engine 2 through an intake duct 11 and an air cleaner 12. The air cleaner 12 is a device that removes foreign matter such as dust or dirt contained in the fresh air to be introduced into the combustion chamber.

Figure 2:
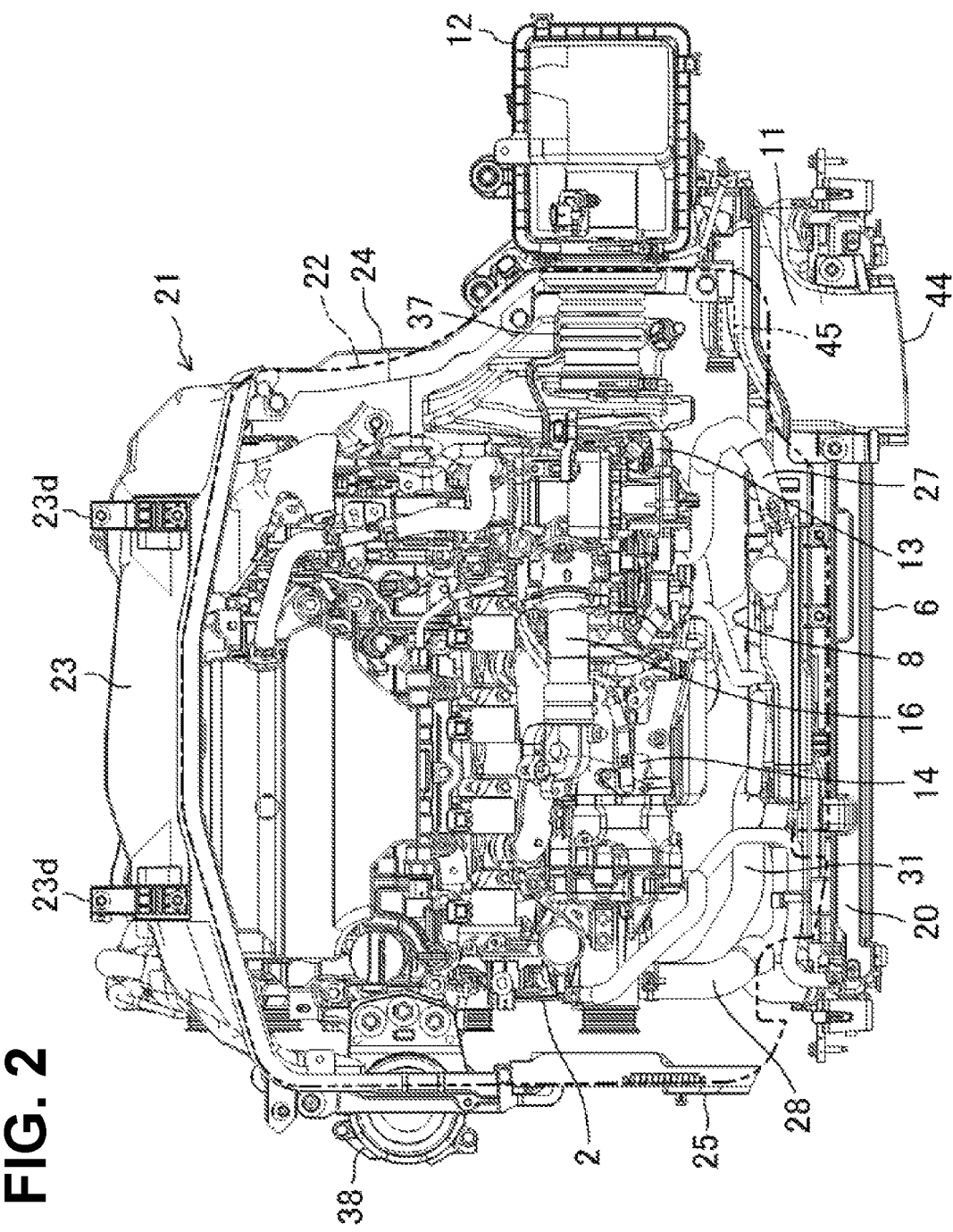
FIG. 2 is a plan view illustrating a state in which the engine is covered with the heat storage cover (note that a top face cover portion is indicated by the chain line to represent an inside of the cover).

FIG. 2 is a view of the engine 2 as viewed from the top, with a top face cover 22 of a heat storage cover 21, which will be described later, being removed.

Figure 3:
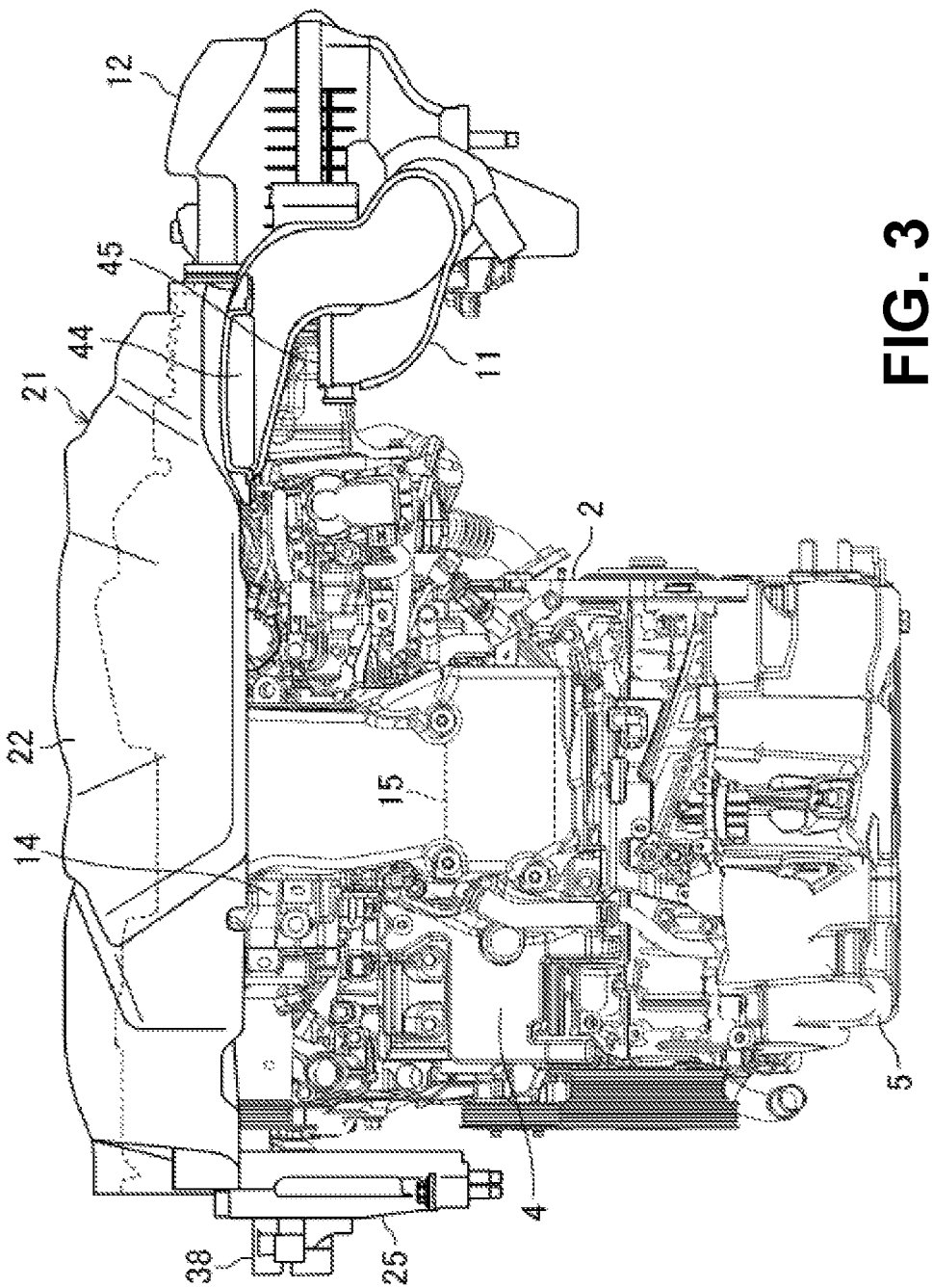
FIG. 3 is a front view illustrating a state in which the engine is covered with the heat storage cover.

As illustrated in the same figure, the fresh air passes through an intake pipe 13 including a throttle valve from the air cleaner 12 and is introduced into a supercharger 14. The supercharger 14 increases the pressure of the fresh air to be introduced into the combustion chamber. The supercharger 14 of the present example is a mechanical supercharger that is driven via a belt by the crankshaft of the engine 2. Note that an electric supercharger or a turbocharger that is driven by exhaust energy may be adopted. The fresh air passing through the supercharger 14 is cooled by an intercooler 15 illustrated in FIG. 3 and is introduced into the combustion chamber of each cylinder via a surge tank and an intake manifold.

As illustrated in FIG. 2, a bypass pipe 16 bypassing the supercharger 14 and leading the fresh air to the surge tank branches from the intake pipe 13. The bypass pipe 16 is provided with a bypass valve that adjusts an opening area of a conduit of the bypass pipe 16. An exhaust gas recirculation (EGR) pipe 17 illustrated in FIG. 1 is connected to a section upstream of the bypass valve of the bypass pipe 16. The EGR pipe 17 returns, as EGR gas, a portion of exhaust gas to the combustion chamber and includes an EGR cooler 18 that cools the EGR gas.

The intake duct 11, the air cleaner 12, the intake pipe 13, the supercharger 14, the intercooler 15, the surge tank, and the intake manifold which form an air intake system of the engine 2 are disposed on the front side of the engine 2, and an exhaust manifold and an exhaust pipe continuing to the exhaust manifold which form an exhaust system of the engine 2 are disposed on the rear side of the engine 2. That is, the engine 2 is a front intake and rear exhaust engine.

<Cover Structure of Engine>

The heat storage cover 21 is provided in the engine room 1, covers the engine 2 from above the engine 2, and surrounds the periphery of an upper portion of the engine 2. Heat dissipated from the engine 2 is stored inside the heat storage cover 21 through the medium of air, and the heat storage cover 21 blocks at least a part of upward heat dissipation.

Here, "the inside of the heat storage cover" refers to the lower side of, in the heat storage cover, an inner face of a portion covering the engine from above, and the inside of, in the heat storage cover, an inner face of a portion at least partially surrounding the periphery of the engine.

Figure 4:
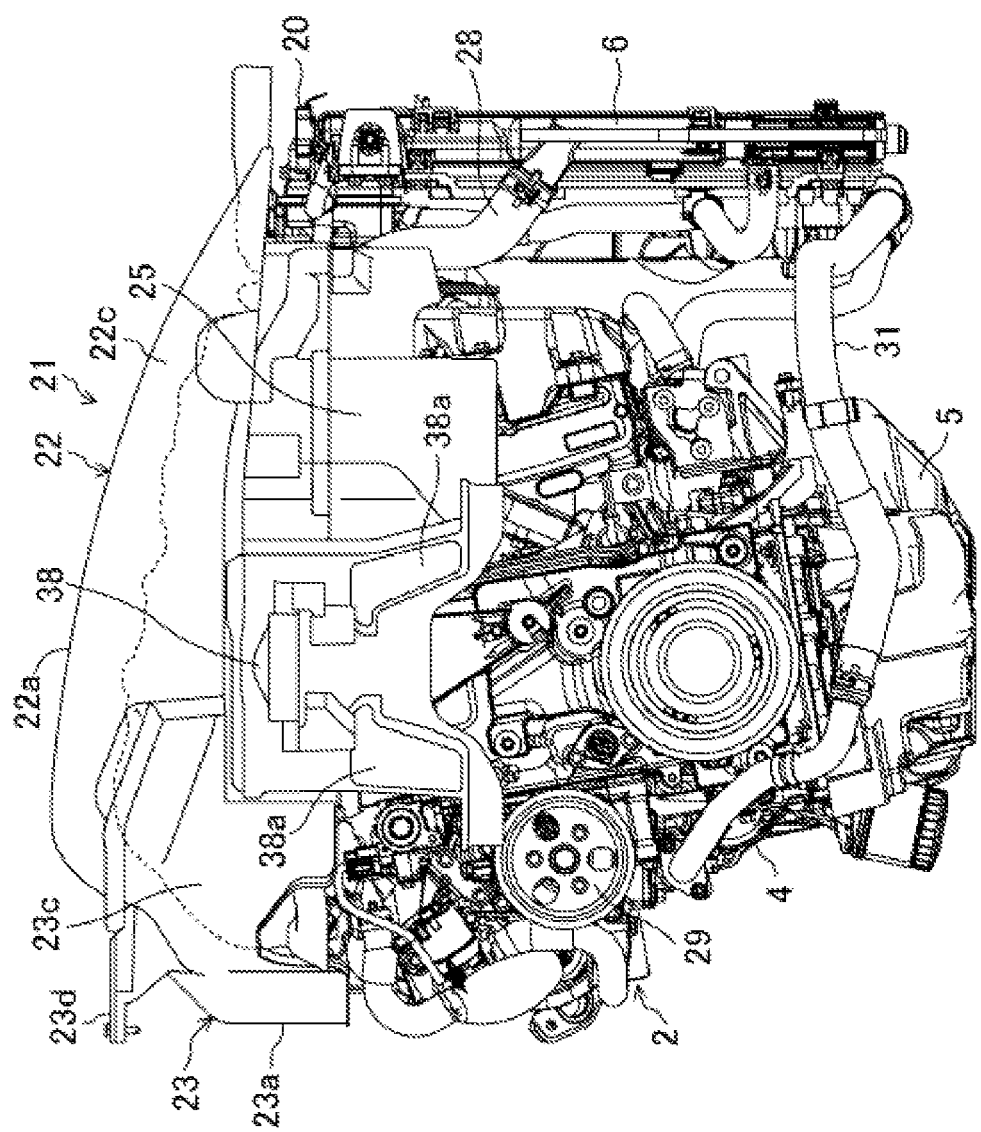
FIG. 4 is a left side view illustrating a state in which the engine is covered with the heat storage cover.

The heat storage cover 21 includes, as illustrated in FIG. 1, the top face cover portion 22 covering the engine 2 from above, a rear face cover portion 23 continuous to the top face cover portion 22 and covering the upper portion of the engine 2 from behind, and a right-side face cover portion 24 continuous to the top face cover portion 22 and covering the upper portion of the engine 2 from the right side, and further includes, as illustrated in FIG. 4, a left-side face cover portion 25 continuous to the top face cover portion 22 and covering the upper portion of the engine 2 from the left side.

A radiator 6 that cools cooling water of the engine 2 by heat exchange with air is disposed in front of the engine 2 so as to cover the engine 2 from the front side. A grille shutter 7 capable of blocking ventilation from the front side to the radiator 6 is provided in front of the radiator 6. The radiator 6 includes, on the back side, a radiator fan 8 that dissipates heat of the cooling water toward the engine 2. A front grille 9 is provided in front of the grille shutter 7.

The grille shutter 7 has a plurality of flaps 26 disposed at intervals in the up-down direction and includes an actuator that pivots each of the plurality of flaps 26. When the flaps 26 become horizontal as indicated by the chain line, ventilation from the front side to the radiator 6 is allowed, and when the flaps 26 become vertical as indicated by the solid line, the ventilation to the radiator 6 is blocked. When a passage switching mechanism of the intake duct 11, which will be described later, is operated and introduction of the fresh air into the combustion chamber of the engine 2 is brought into an inside air introduction state, in the grille shutter 7, the flaps 26 become vertical, thereby suppressing collision of vehicle traveling air against the radiator 6. As a result, heat dissipation from the engine room 1 to the front side is also suppressed.

Cooling water inflow hoses 27 and 28 (see FIGS. 2 and 4) through which the cooling water from the engine 2 flows in, and a cooling water outflow hose 31 (see FIGS. 1 and 2) through which cooling water whose temperature has decreased is sent to a water pump 29 illustrated in FIG. 4 are connected to the radiator 6.

Here, the heat storage cover 21 blocks heat dissipation from the upper portion of the engine 2 to the upper side and the periphery, thereby contributing to keeping the engine 2 warm. On the other hand, the radiator 6 and the grille shutter 7 block heat dissipation from the engine 2 to the front side, thereby contributing to keeping the engine 2 warm. Furthermore, the radiator 6 emits the heat of the cooling water toward the engine 2 by using the radiator fan 8, thereby making heat storage of the heat storage cover 21 advantageous.

(Details of Heat Storage Cover)

Figure 5:
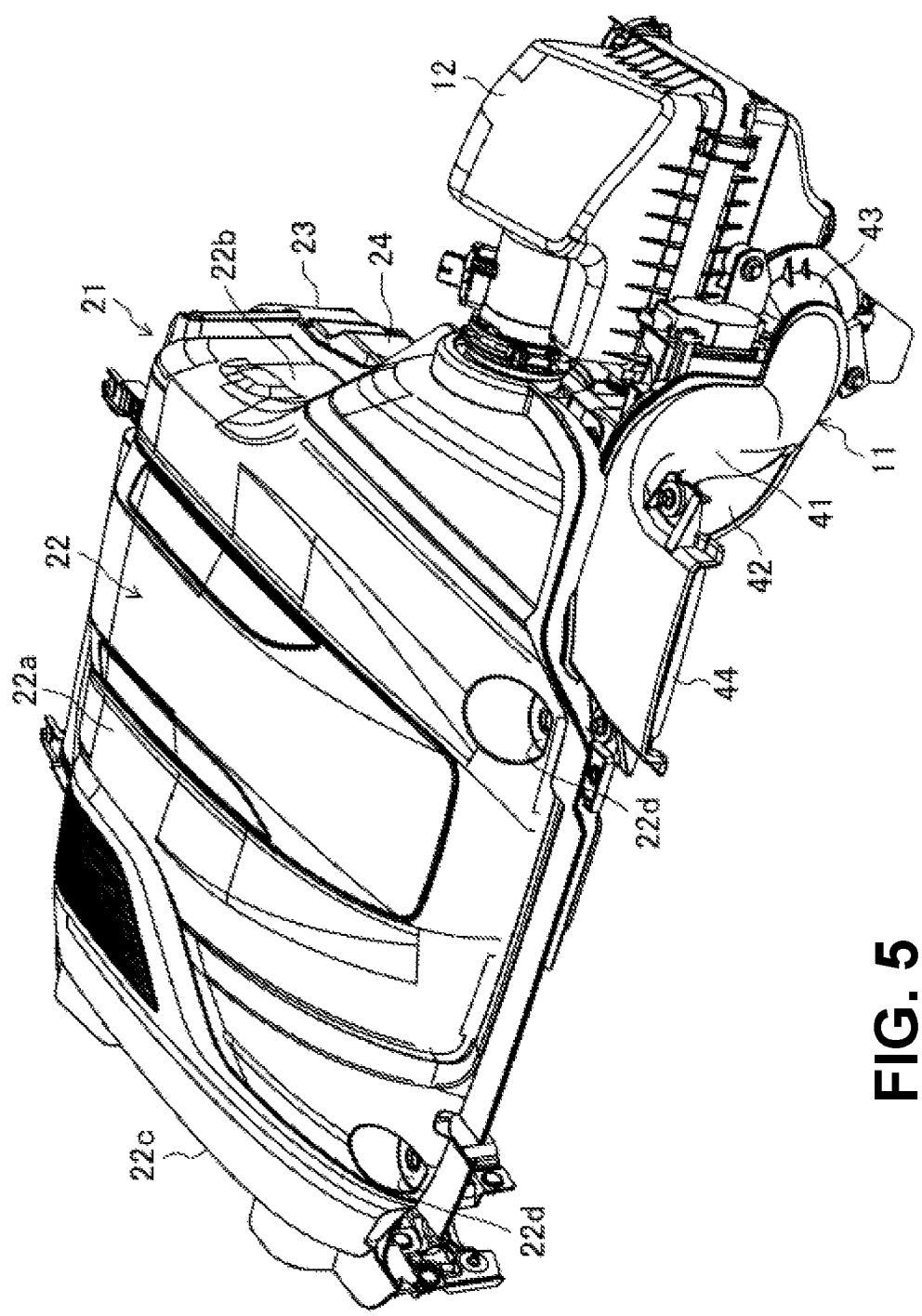
FIG. 5 is a perspective view illustrating an intake duct, an air cleaner, and the heat storage cover.

As illustrated in FIG. 5, the air cleaner 12 is disposed on the right outer side of the heat storage cover 21 as viewed from the vehicle front side. The intake duct 11 is disposed on the outside of the heat storage cover 21 and on the front side of the air cleaner 12.

As illustrated in FIGS. 1, 4, and 5, the top face cover portion 22 of the heat storage cover 21 includes an upper wall 22a gradually inclined downward toward the front side, and upper side walls 22b and 22c (see FIGS. 1 and 4) continuing to both side edges of the upper wall 22a and extending downward. The upper wall 22a spreads outward relative to a top face of the engine 2 so as to cover the entire top face of the engine 2. A front end portion of the upper wall 22a is provided with a fixed portion 22d for fixing the heat storage cover 21 to a radiator shroud 20.

Figure 6:
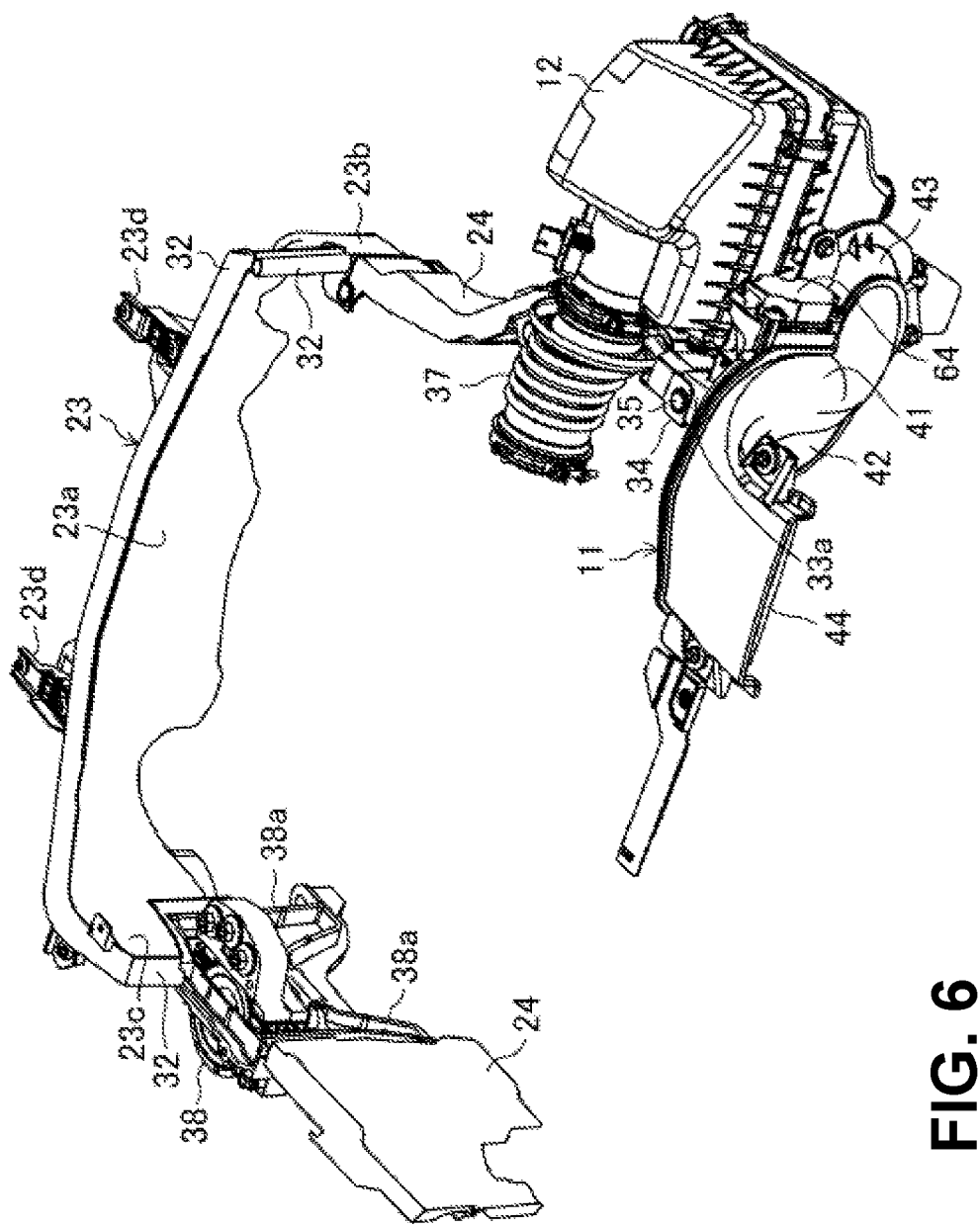
FIG. 6 is a perspective view similar to FIG. 5 which is illustrated in a state in which the top face cover portion of the heat storage cover is excluded.

As illustrated in FIGS. 1, 4, and 6, the rear face cover portion 23 of the heat storage cover 21 includes a rear wall 23a spread in the left-right direction so as to cover a rear face of the upper portion of the engine 2, and rear side walls 23b and 23c continuing to respective side edges of the rear wall 23a and extending forward. The rear wall 23a includes a bracket 23d protruding rearward for fixing the heat storage cover 21 to a cowl panel of the vehicle. As illustrated in FIG. 6, an upper end of the rear wall 23a and front end upper portions of the rear side walls 23b and 23c are each provided with a seal 32 for preventing a gap with respect to the top face cover portion 22 from occurring. That is, a rear end edge of each of the upper wall 22a and the upper side wall 22b in the top face cover portion 22 abuts against the seal 32.

Figure 7:
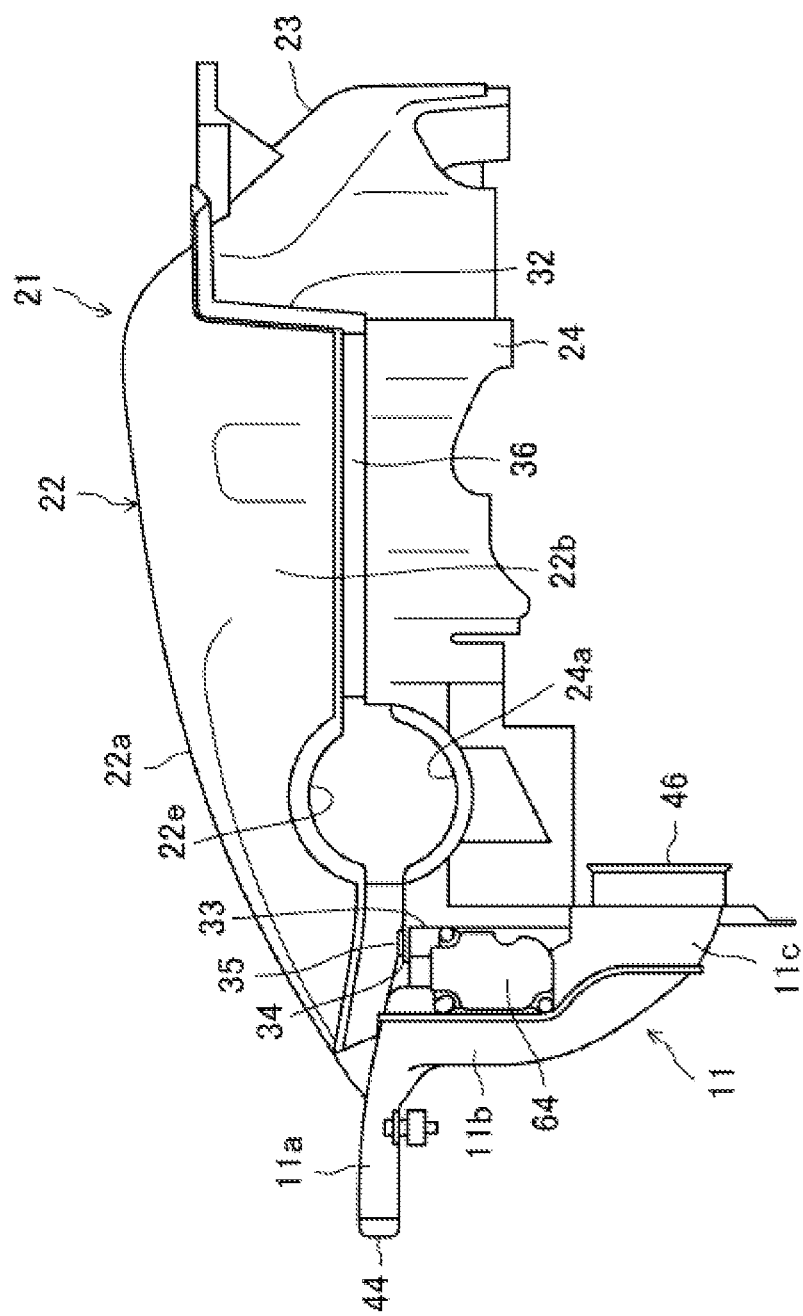
FIG. 7 is a right side view illustrating the top face cover portion of the heat storage cover, a right-side face cover portion of the heat storage cover, and the intake duct.
Figure 8:
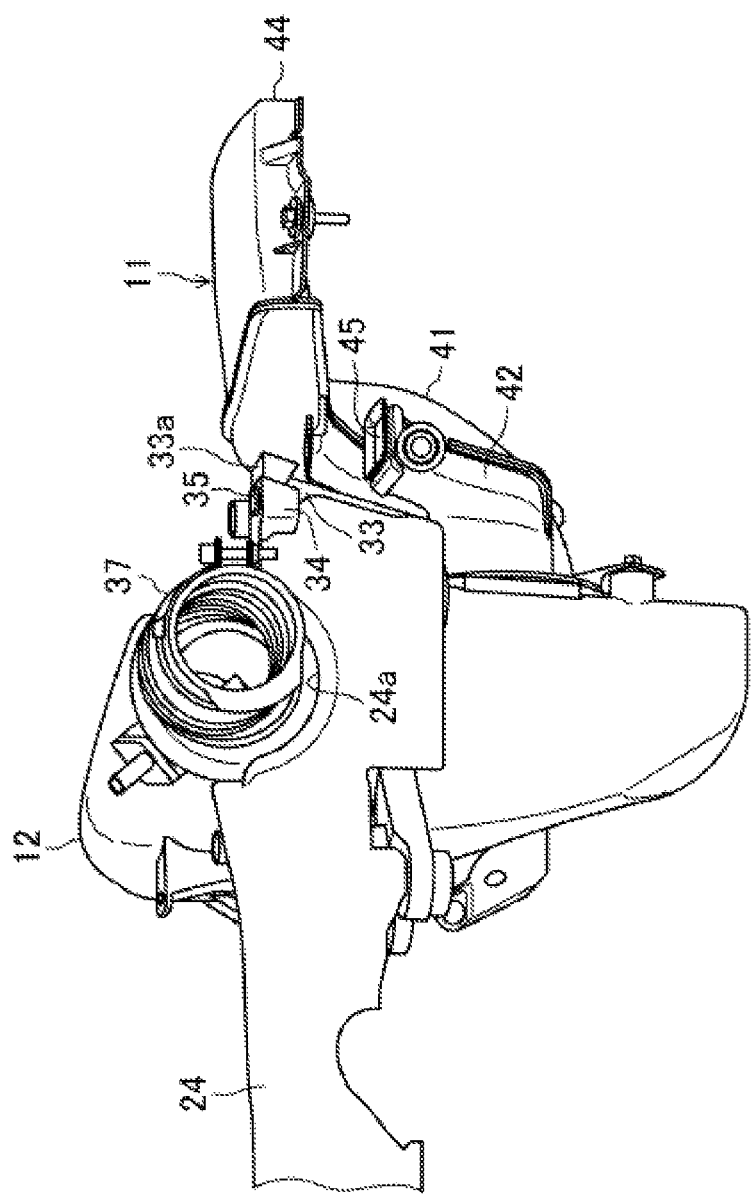
FIG. 8 is a perspective view illustrating a relationship between the intake duct and the right-side face cover, as viewed from the inside of the cover.

As illustrated in FIGS. 1 and 7, the right-side face cover portion 24 of the heat storage cover 21 spreads in the front-rear direction so as to cover the upper portion of the engine 2 from the right side together with a right-side rear side wall of the rear face cover portion 23. A front end edge of the right-side face cover portion 24 abuts against a protrusion 33 (see FIGS. 7 and 10) protruding rearward relative to the intake duct 11 and extending in the up-down direction. As illustrated in FIGS. 6 to 8, a mounting piece 34 protruding forward relative to an upper end of the front end edge of the right-side face cover portion 24 is fixed to a mounting portion 33a of an upper end of the protrusion 33 of the intake duct 11 by a clip 35 having a retaining function as a fastening member. A rear end edge of the right-side face cover portion 24 abuts against a front end lower portion of the right-side rear side wall 23b of the rear face cover portion 23.

Here, as illustrated in FIG. 7, the intake duct 11 is provided with an outside air inlet 44, which will be described later, at substantially the same height as an upper edge of the right-side face cover portion 24, and is, when the whole of the duct is viewed from the lateral side, formed so as to include an upper portion 11a substantially horizontally extending rearward from the outside air introduction port 44, an intermediate portion 11b continuing to the upper portion 11a and extending downward, and a lower portion 11c continuing to the intermediate portion 11b, extending rearward, and connected to the air cleaner 12. As illustrated in FIG. 8, the protrusion 33 of the intake duct 11 passes through the intermediate portion 11b from a rear end of the upper portion 11a of the intake duct 11 and extends in the up-down direction up to the lower portion 11c, and as illustrated in FIG. 7, this protrusion 33 is connected to a side edge on the front side of the right-side face cover portion 24. That is, the intake duct 11 is continuous to the side edge on the front side of the right-side face cover portion 24. Accordingly, the intake duct 11 functions as a cover member covering the upper portion of the engine 2 from the right side together with the right-side face cover portion 24.

As illustrated in FIG. 7, the right-side upper side wall 22b of the top face cover portion 22 is placed on the upper edge of the right-side face cover portion 24 via a seal 36. At a lower edge of the right-side upper side wall 22b of the top face cover portion 22 and the upper edge of the right-side face cover portion 24, semi-circular cutouts 22e and 24a are formed which are opposed in the up-down direction and through which a flexible pipe 37 extending toward the engine 2 from the air cleaner 12 illustrated in FIGS. 6 and 8 passes. The flexible pipe 37 is connected to the intake pipe 13 described earlier.

As illustrated in FIGS. 4 and 6, the left-side face cover portion 25 of the heat storage cover 21 spreads in the front-rear direction so as to cover the upper portion of the engine 2 from the left side together with the left-side rear side wall 23c of the rear face cover portion 23 and an engine mount 38. That is, the left-side face cover portion 25 and the left-side rear side wall 23c of the rear face cover portion 23 are disposed on the front and rear sides of the engine mount 38. Accordingly, the engine mount 38 functions as a cover member covering the upper portion of the engine 2 from the left side together with the left-side face cover portion 25. The engine mount 38 has front and rear leg portions 38a fixed to a front side frame of the vehicle and has an upper portion on which the engine 2 is supported. In the engine mount 38, a space between the front and rear leg portions 38a is blocked from the viewpoint of obtaining a cover function.

<Disposition and Structure of Intake Duct>

Figure 9:
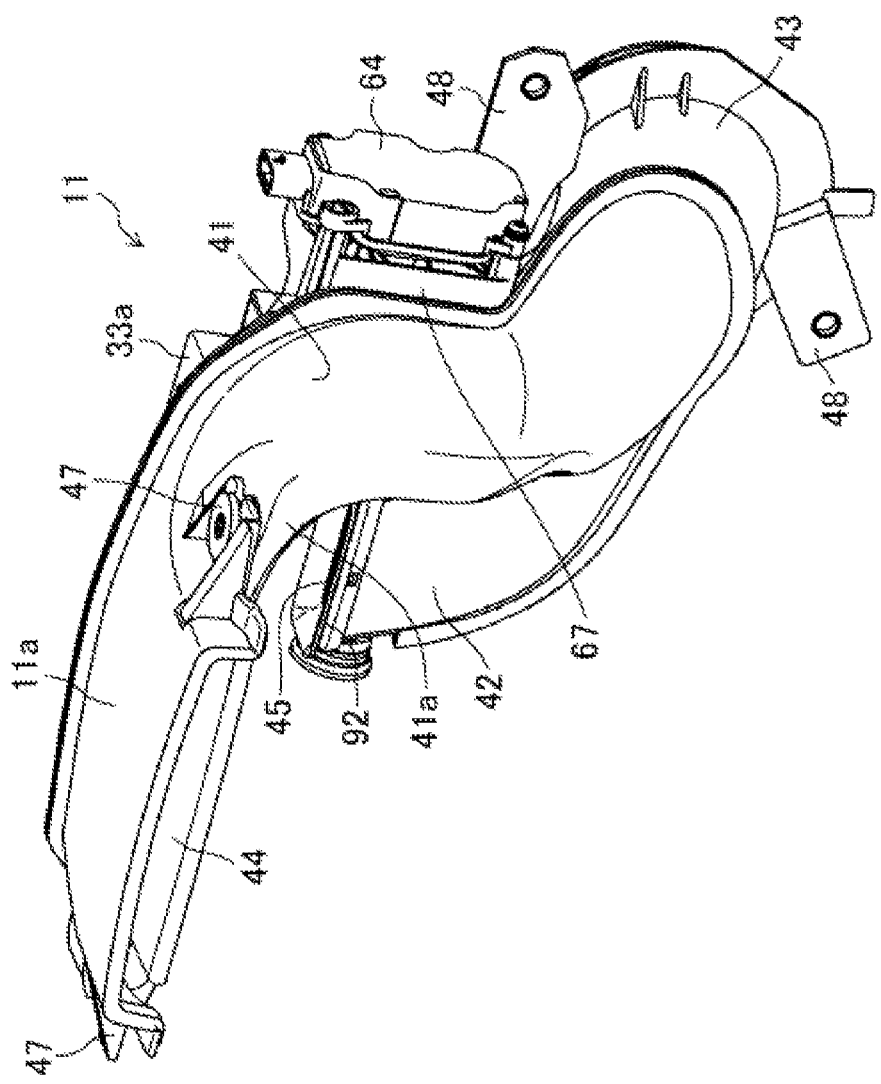
FIG. 9 is a perspective view illustrating the intake duct, as viewed from the diagonally right front side.
Figure 10:
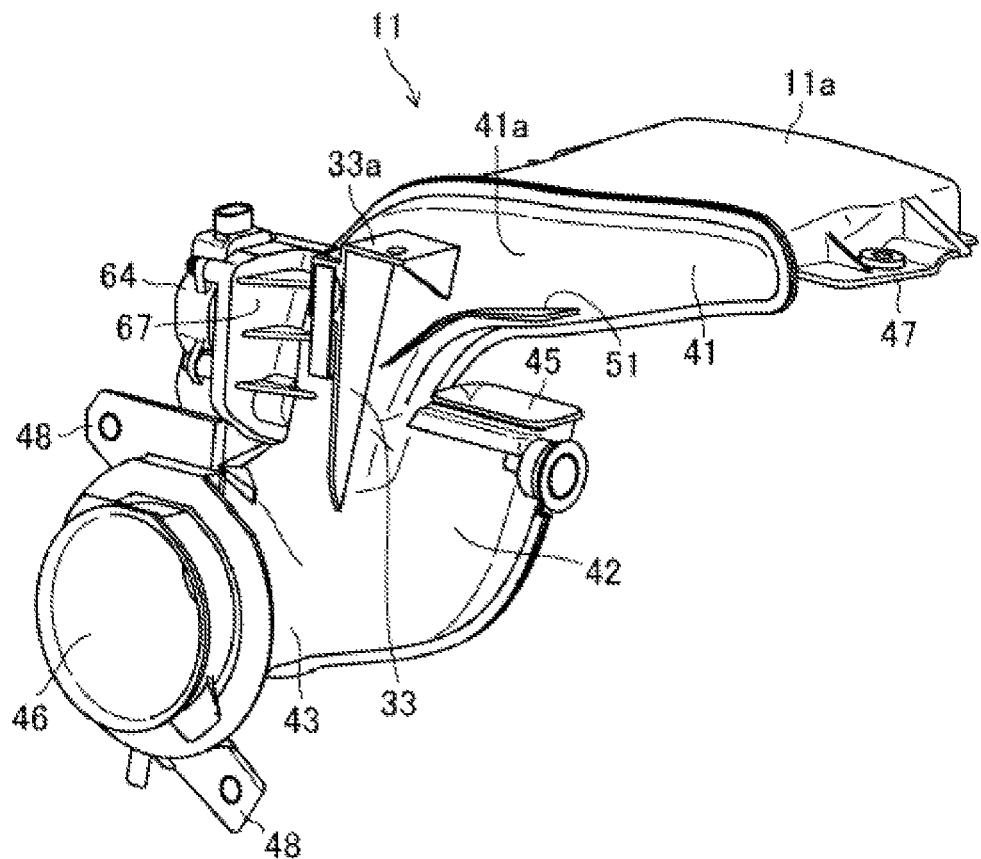
FIG. 10 is a perspective view illustrating the intake duct, as viewed from the diagonally left rear side.

As illustrated in FIGS. 9 and 10, the intake duct 11 includes an outside air introduction duct portion 41 for introducing outside air which is air outside the engine room 1 and an inside air introduction duct portion 42 for introducing air inside the engine room 1, and is a composite duct in which both duct portions 41 and 42 are connected to one downstream duct portion 43.

An upstream end of the outside air introduction duct portion 41 is provided with the outside air inlet 44 open forward and having a horizontally long rectangular shape. An upstream end of the inside air introduction duct portion 42 is provided with an inside air inlet 45 open upward and having a horizontally long rectangular shape. At a downstream end of the downstream duct portion 43, a connection port 46 connected to the air cleaner 12 is open rearward.

Figure 11:
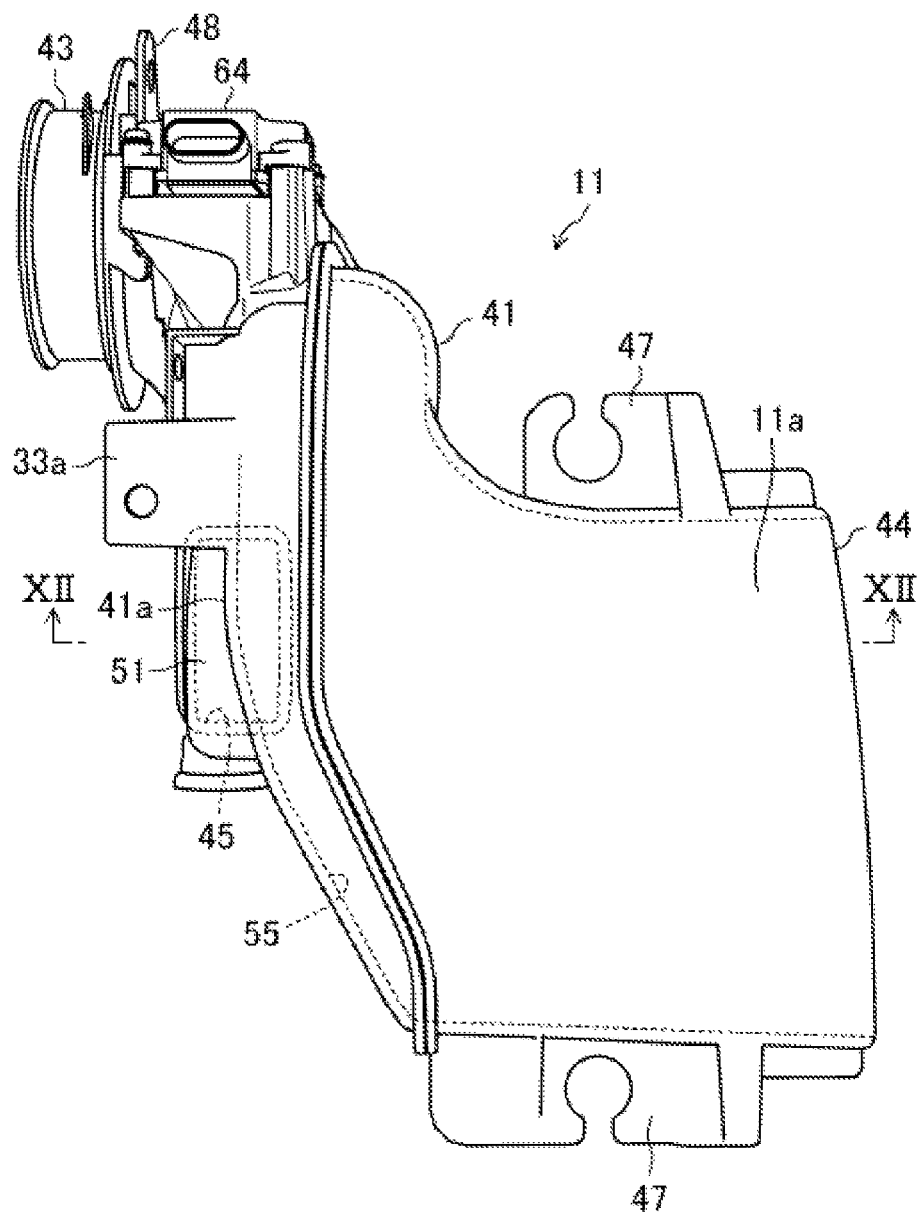
FIG. 11 is a plan view of the intake duct.

As illustrated in FIG. 11, the intake duct 11 includes mounting pieces 47 protruding toward both sides of the upper portion 11a from the upper portion 11a extending rearward from the outside air inlet 44 of the outside air introduction duct portion 41. The downstream end of the downstream duct portion 43 is provided with a flange 48 for connecting to the air cleaner 12.

In the intake duct 11, the mounting pieces 47 are fixed to a top face of the radiator shroud 20 illustrated in FIG. 1. Thus, the outside air inlet 44 of the outside air introduction duct portion 41 is provided so as to face forward from the top of the radiator shroud 20. On the other hand, as illustrated in FIG. 2, the inside air inlet 45 of the intake duct 11 is provided between the engine 2 and the radiator 6 so as to face the inside of the heat storage cover 21 from below. Note that the inside air inlet 45 is covered with the outside air introduction duct portion 41 and a projection portion 51, which will be described later, from the top.

(Cover Structure of Inside Air Inlet)

A part of the inside air inlet 45 of the inside air introduction duct portion is covered with the outside air introduction duct portion 41 from the top with a gap, and the remaining portion of the inside air inlet 45 is covered with the projection portion 51 from the top with a gap. Hereinafter, this cover structure will be described.

As illustrated in FIG. 9, the outside air introduction duct portion 41 and the inside air introduction duct portion 42 branch from the downstream duct portion 43 and rise so as to be arranged in the left-right direction, and the outside air introduction duct portion 41 rises so as to be higher than the inside air inlet 45 of the inside air introduction duct portion 42.

Figure 12:
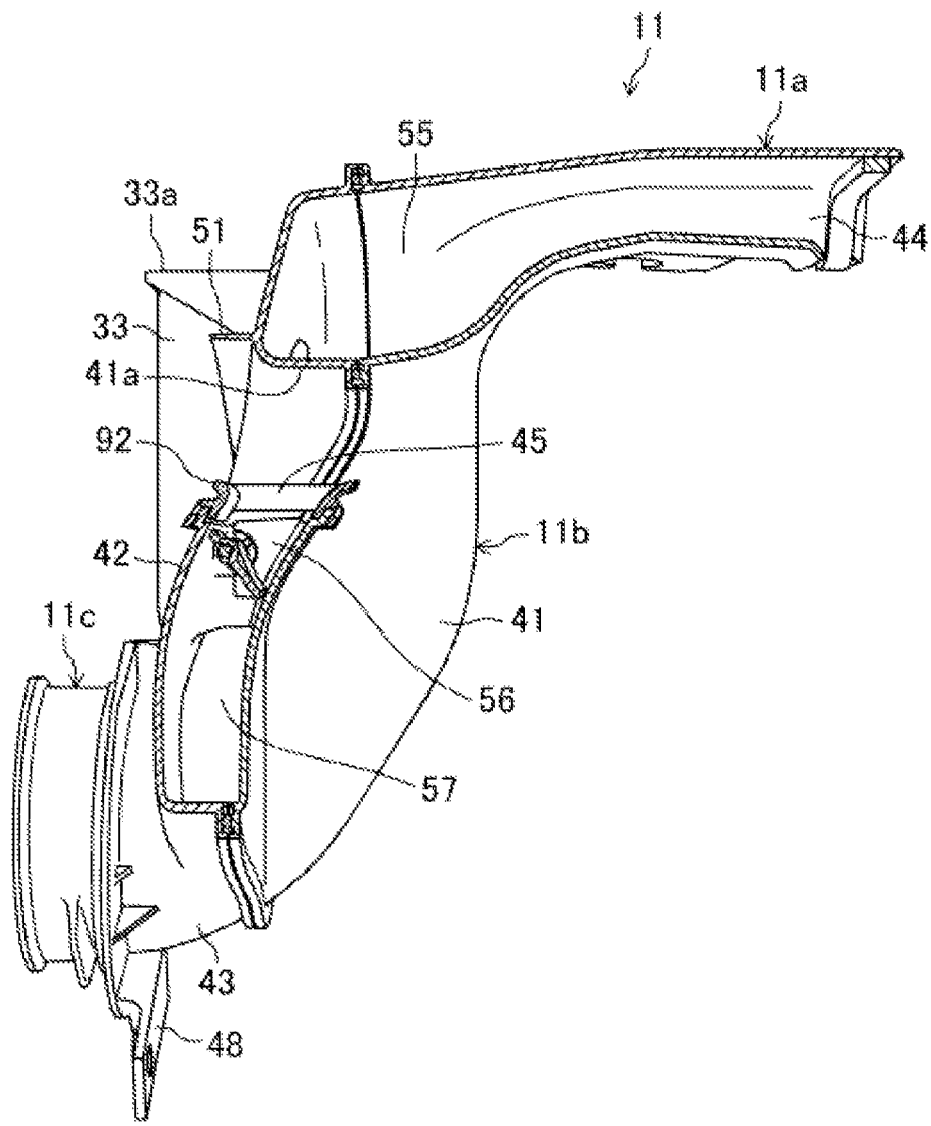
FIG. 12 is a cross-sectional view taken along line XII-XII of FIG. 11.

As illustrated in FIGS. 10 and 11, the outside air introduction duct portion 41, at a higher position than the inside air inlet 45 of the inside air introduction duct portion 42, has a duct wall 41a curved toward the inside air introduction duct portion 42 side and extending forward diagonally across above the inside air inlet 45 of the inside air introduction duct portion 42. As also illustrated in FIGS. 11 and 12, a front-side portion of the inside air inlet 45 of the inside air introduction duct portion 42 is formed so as to be covered by this duct wall 41a from above. A portion extending forward from the duct wall 41a of the outside air introduction duct portion 41 forms the upper portion 11a of the intake duct 11.

The outside air introduction duct portion 41 includes the projection portion 51 having a collar-like shape and protruding rearward above the inside air inlet 45 of the inside air introduction duct portion 42 from a rear face of the duct wall 41a. This projection portion 51 covers the remaining portion of the inside air inlet 45 from above. As illustrated in FIG. 10, the projection portion 51 is inclined downward toward a rising portion of the outside air introduction duct portion 41, and this inclined portion covers the inside air inlet 45 from the lateral side, that is, from the diagonally upper side.

From the viewpoint of prevention of entry of foreign matter, it is advantageous that an interval between the projection portion 51 and the inside air take-in port 45 is as narrow as possible. If it is desired to prevent entry of a bolt during assembly, it is conceivable that, for example, the interval between the projection portion 51 and the inside air take-in port 45 is set so as to be smaller than the diameter of an M6 nut. Note that if the interval is narrowed excessively, the projection portion 51 serves as a ventilation resistance and prevents inside air from being brought into the inside air take-in port 45. Accordingly, the interval between the projection portion 51 and the inside air take-in port 45 is preferably set in a range of, for example, 10 to 60 mm in comprehensive consideration of these problems. In the present embodiment, this interval is 40 mm.

(Passage Switching Mechanism of Intake Duct)

The passage switching mechanism of the intake duct 11 switches the introduction of the fresh air into the combustion chamber of the engine 2 between an outside air introduction state in which outside air outside the engine room 1 is introduced into the air cleaner 12 by the outside air introduction duct portion 41, and the inside air introduction state in which air in the engine room 1, in particular, hot air obtained by the heat storage cover 21, is introduced into the air cleaner 12 by the inside air introduction duct portion 42. Thus, the passage switching mechanism includes a first valve 61 and a second valve 62, which will be described later.

Figure 13:
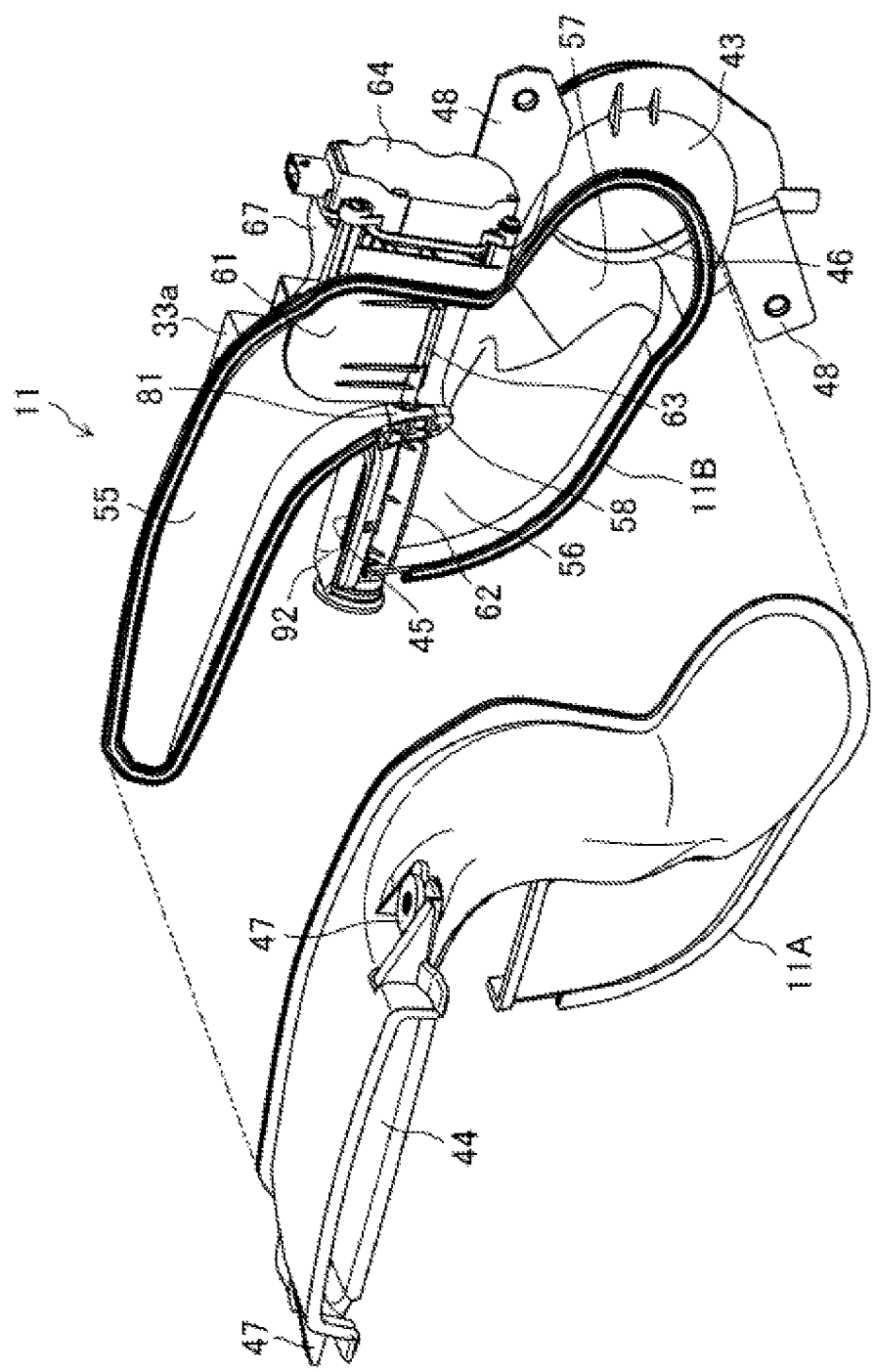
FIG. 13 is an exploded perspective view of the intake duct.

As illustrated in FIG. 13, the intake duct 11 is formed by a first duct member 11A made of synthetic resin and a second duct member 11B made of synthetic resin being mated at respective peripheral edge portions and welded together. In the present example, the first duct member 11A forms a front portion of the intake duct 11 including the outside air inlet 44 of the outside air introduction duct portion 41. The second duct member 11B forms a rear portion of the intake duct 11 including the connection port 46 of the downstream duct portion 43. The first duct member 11A and the second duct member 11B are mated, so that the outside air introduction duct portion 41, inside air introduction duct portion 42, and downstream duct portion 43 of the intake duct 11 are completed.

As illustrated in FIG. 13, the outside air introduction duct portion 41 forms an outside air introduction passage 55, and the inside air introduction duct 42 forms an inside air introduction passage 56. The outside air introduction passage 55 and the inside air introduction passage 56 continue to a downstream introduction passage 57 formed by the downstream duct portion 43. The first valve 61 that opens and closes the outside air introduction passage 55 is disposed in the outside air introduction duct portion 41, and the second valve 62 that opens and closes the inside air introduction passage 56 is disposed in the inside air introduction duct portion 42.

As described earlier, the outside air introduction duct portion 41 and the inside air introduction duct portion 42 branch from the downstream duct portion 43 and rise so as to be arranged in the left-right direction, and the first valve 61 and the second valve 62 are disposed at base ends of the rising of the outside air introduction duct portion 41 and the rising of the inside air introduction duct portion 42. That is, a first valve disposition portion of the outside air introduction passage 55 and a second valve disposition portion of the inside air introduction passage 56 are provided in parallel across a partition wall 58 separating both passages 55 and 56.

The first duct member 11A forms a part of the first valve disposition portion of the outside air introduction passage 55 and a part of the second valve disposition portion of the inside air introduction passage 56 in respective passage wall circumferential directions, and the second duct member 11B forms the remaining portions thereof in the passage wall circumferential directions.

The first valve 61 is a flap-type valve, and the second valve 62 is a butterfly-type valve. That is, both valves 61 and are rotation-type valves that rotate to open and close the passages, and are supported on one rotation shaft 63 extending over both of the outside air introduction duct portion 41 and the inside air introduction duct portion 42. Both valves 61 and 62 are positioned at a predetermined angle with respect to the rotation shaft 63 and supported so that, when either one of them is open, the other one is closed.

The rotation shaft 63 is supported on the second duct member 11B forming the rear portion of the intake duct 11, and an actuator 64 that rotationally drives the rotation shaft 63 is also supported on the second duct member 11B. That is, as illustrated in FIG. 14, the second duct member 11B is provided with shaft support portions 65 and 66 for allowing the second duct member 11B to solely support the rotation shaft 63, and an actuator support portion 67 for allowing the second duct member 11B to solely support the actuator 64.

In the present example, the shaft support portions 65 and are provided in opposing duct walls on the outside air introduction duct portion 41 side and on the inside air introduction duct portion 42 side in the second duct member 11B. The actuator support portion 67 is provided on an outside face on the outside air introduction duct portion 41 side in the second duct member 11B.

As described above, the rotation shaft 63 is supported on the second duct member 11B, so that the first valve 61 and the second valve 62 are also supported on the second duct member 11B by the second duct member 11B alone.

Figure 14:
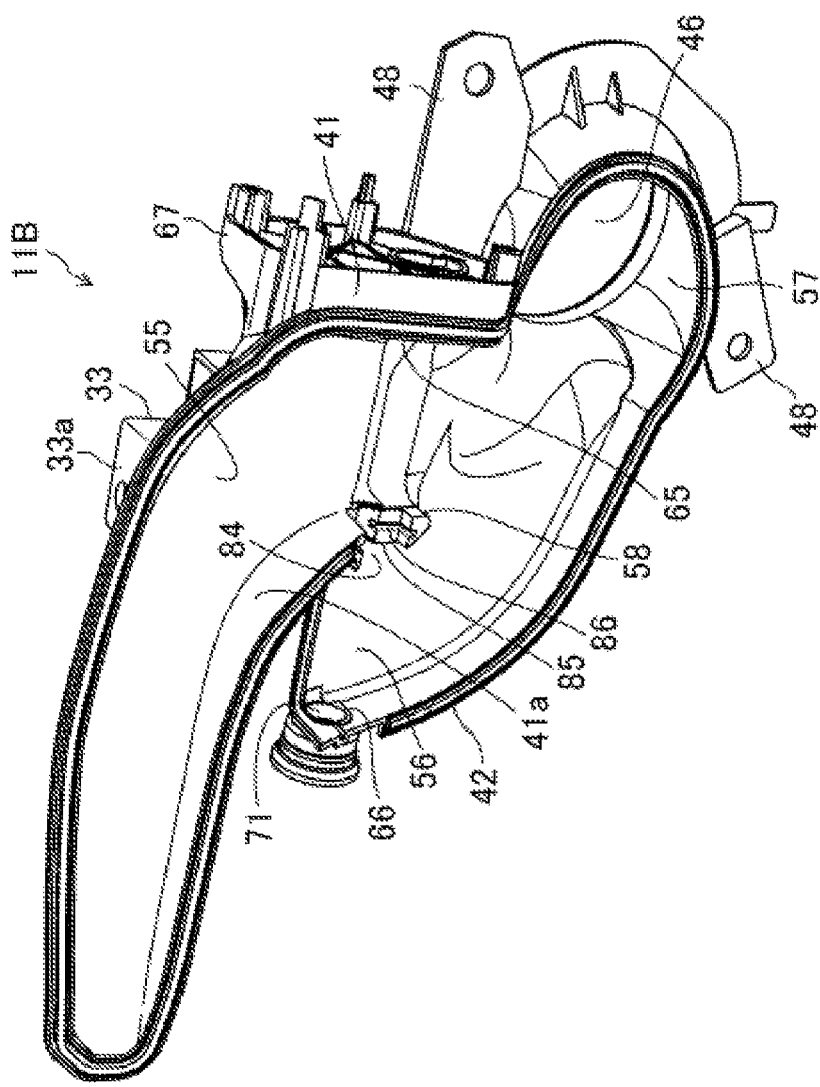
FIG. 14 is a perspective view illustrating a second duct member of the intake duct in a state in which a passage switching mechanism is excluded.
Figure 15:
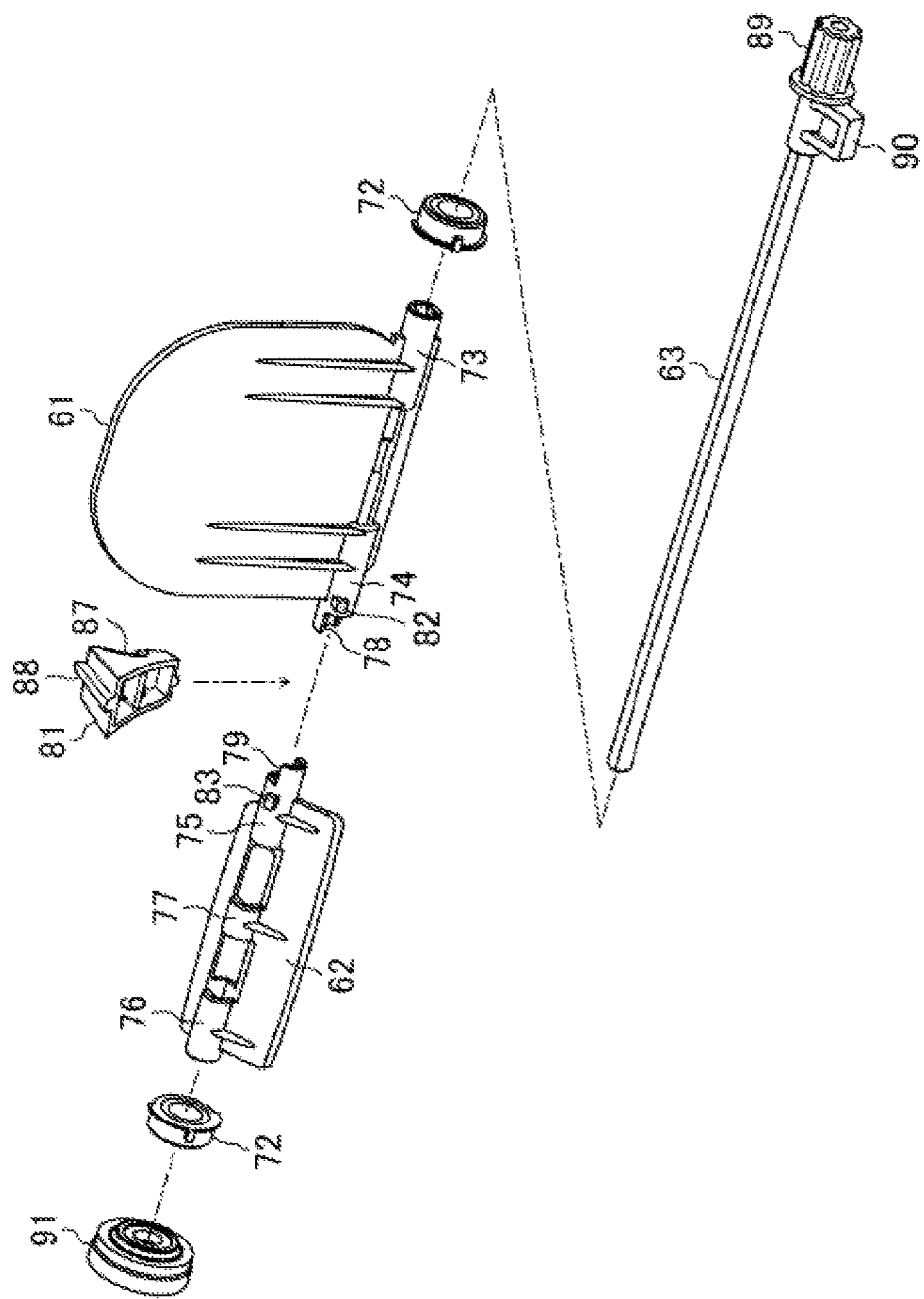
FIG. 15 is an exploded perspective view of the passage switching mechanism.

As illustrated in FIG. 14, the shaft support portion 66 on the inside air introduction duct portion 42 side is provided with a support hole 71, and a bush 72 illustrated in FIG. 15 is fitted to the support hole 71. Similarly, the shaft support portion 65 on the outside air introduction duct portion 41 side is provided with a support hole 71 (illustration omitted), and a bush 72 illustrated in FIG. 15 is fitted to the support hole 71.

As illustrated in FIG. 15, the rotation shaft 63 is a shaft having a square shape (rectangular cross-section in the present example) and is passed through cylindrical fitting portions 73 to 77 provided at shaft portions of the first valve 61 and the second valve 62. The first valve 61 is provided with, at two locations on both sides in the axis direction, the fitting portions 73 and whose end portions protrude outward in the axis direction relative to the first valve 61. The second valve 62 is provided with, at two locations on both sides in the axis direction, the fitting portions 75 and 76 whose end portions protrude outward in the axis direction relative to the second valve 62, and is provided with the fitting portion 77 at one intermediate location.

Outer circumferential faces of the fitting portions 73 to 77 in the first valve 61 and the second valve 62 are circular, while fitting holes thereof all have a square shape corresponding to the cross-sectional shape of the rotation shaft 63. The rotation shaft 63 is passed through the fitting holes of the fitting portions 73 to 77 of both valves 61 and 62, and both valves 61 and 62 are supported so as not to rotate with respect to the rotation shaft 63.

In a state in which the rotation shaft 63 is passed through the fitting portions 73 to 77 of the valves 61 and 62, the fitting portions 73 and 76 at both ends of the fitting portions 73 to 77 are fitted to the bushes 72 of the shaft support portions 65 and 66 and rotatably supported thereon. In other words, the rotation shaft 63 is rotatably supported on the bushes 72 of the shaft support portions 65 and 66 via the fitting portions 73 and 76 of the valves 61 and 62.

Axially opposed end portions of the fitting portion 74 of the first valve 61 and the fitting portion 75 of the second valve 62 which are axially adjacent to each other have a shape cut out in a semi-cylindrical shape, and the cutout portions are engagement portions 78 and 79. Both engagement portions 78 and 79 engage with each other in the valve rotation direction in a state in which the rotation shaft 63 is passed through the fitting portions 73 to 77, and regulate a relative position between the first valve 61 and the second valve 62 in the valve rotation direction.

Figure 16:
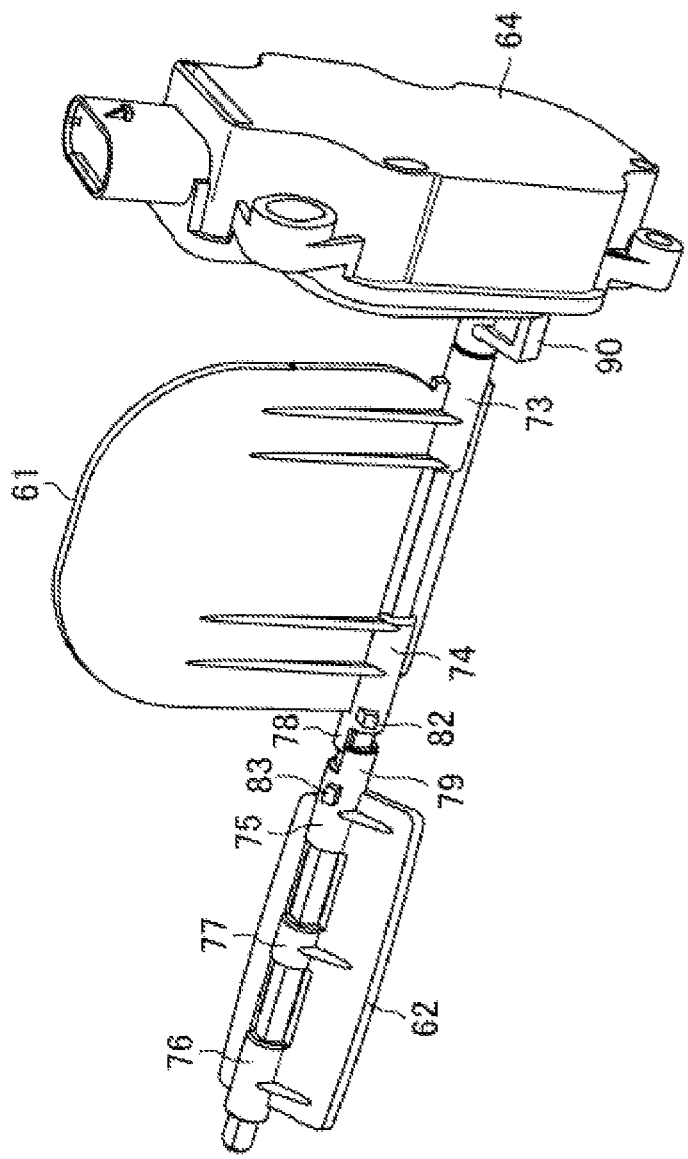
FIG. 16 is a perspective view illustrating the passage switching mechanism in an assembled state.

That is, as illustrated in FIG. 16, when, in a state in which the engagement portions 78 and 79 of both valves 61 and 62 are engaged with each other, the rotation shaft 63 is passed through the fitting portions 73 to 77 of both valves 61 and 62, both valves 61 and 62 are brought into a state of being positioned with respect to the rotation shaft 63 so that, by rotation of the rotation shaft 63, when either one of them is open, the other one is closed. In the case of the present example, both valves 61 and 62 are positioned in a state in which valve bodies thereof are shifted by 90 degrees in the rotation direction.

The fitting portion 74 of the first valve 61 and the fitting portion 75 of the second valve 62 which are adjacent to each other are respectively provided with projections 82 and 83 protruding laterally for allowing a spacer 81 illustrated in FIG. 15 to regulate positions of both valves 61 and 62 in the valve axis direction.

Hereinafter, specific description will be given. As illustrated in FIG. 14, in the partition wall 58 of the second duct member 11B, a spacer receiver 85 is formed which has a recess 84 to which the fitting portions 74 and 75 are rotatably fitted. A fitting groove 86 is formed in this spacer receiver 85. On the other hand, a recess 87 corresponding to the recess 84 of the spacer receiver 85 and a ridge 88 to be fitted to the fitting groove 86 are formed in the spacer 81. The spacer 81 is dimensioned so that the length thereof in the valve axis direction is equivalent to an interval between the projections 82 and 83 when both valves 61 and 62 are positioned in normal positions of the outside air introduction duct portion 41 and the inside air introduction duct portion 42.

Figure 17:
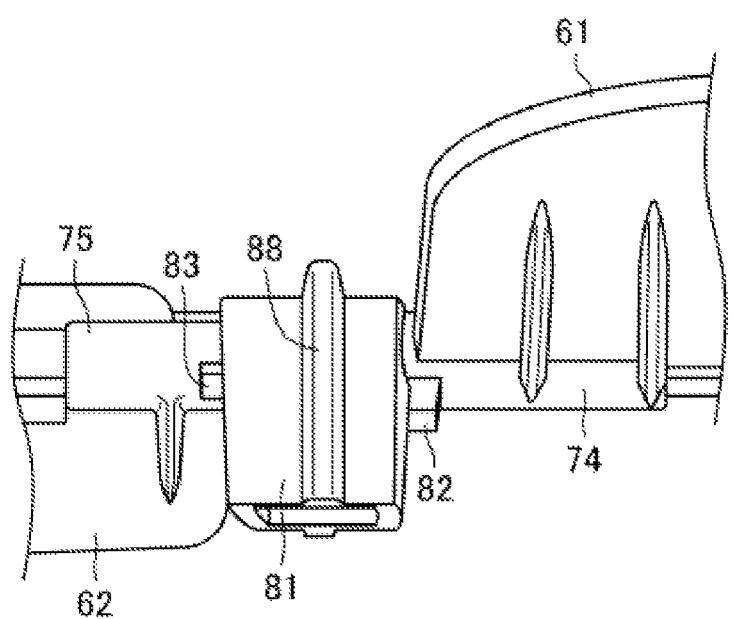
FIG. 17 is a front view illustrating a part of the assembled state of the passage switching mechanism.

In a state in which the first valve 61 and the second valve 62 are set in the second duct member 11B, the ridge 88 is fitted to the fitting groove 86, so that the spacer 81 is placed in the spacer receiver 85. At this time, as illustrated in FIG. 17, the projection 82 on the first valve 61 side abuts against one side of the spacer 81, and the projection 83 on the second valve 62 side abuts against the opposite side of the spacer 81. The projections 82 and 83 engage with the spacer 81 in the valve axis direction, so that, in both valves 61 and 62, the positions in the valve axis direction are regulated so as not to hinder the opening and closing.

(Assembly of Intake Duct)

The bush 72 illustrated in FIG. 15 is fitted to the support hole 71 of each of the shaft support portions 65 and 66 of the second duct member 11B illustrated in FIG. 14.

Figure 18A:
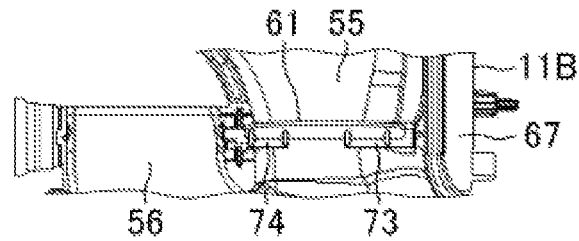
FIG. 18(a)-(e) are perspective views illustrating a state in which the passage switching mechanism is assembled to the intake device.

As illustrated in FIG. 18(a), the first valve 61 is put in the valve disposition portion (first valve disposition portion) on the outside air introduction duct portion 41 side of the second duct member 11B. The first valve 61 is moved in the valve axis direction to fit the fitting portion 73 to the bush 72 of the shaft support portion 65.

Figure 18B:
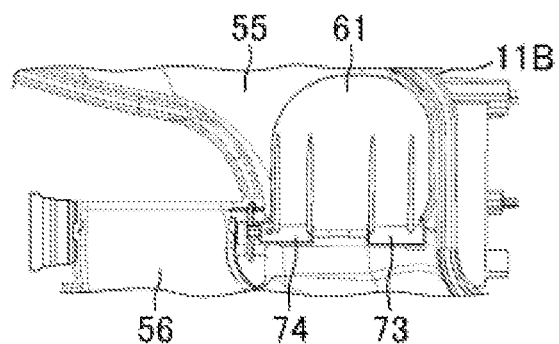

As illustrated in FIG. 18(b), the first valve 61 is positioned at a predetermined rotation angle. That is, in the present example, the first valve 61 rotates so as to abut against a passage wall on the back side of the outside air introduction duct portion 41.

Figure 18C:
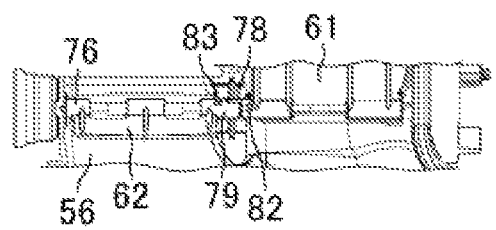

As illustrated in FIG. 18(c), in a state in which the first valve 61 is positioned as described above, the second valve 62 is put in the valve disposition portion (second valve disposition portion) on the inside air introduction duct portion 42 side of the second duct member 11B. At this time, the engagement portion 78 of the first valve 61 and the engagement portion 79 of the second valve 62 are engaged. Thus, both valves 61 and 62 are brought into a state of being relatively positioned at the predetermined rotation angle. Then, the second valve 62 is moved in the valve axis direction to fit the fitting portion 76 to the bush 72 (see FIG. 15) of the shaft support portion 66.

Figure 18D:
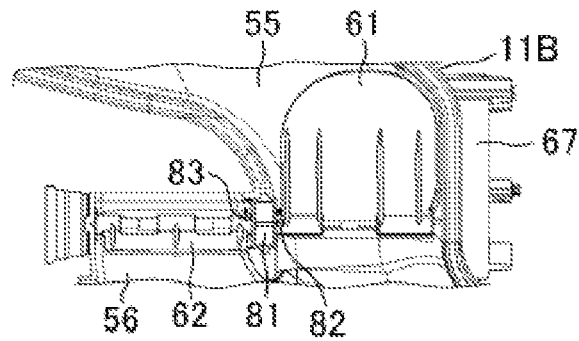

As illustrated in FIG. 18(d), the spacer 81 is fitted to the spacer receiver 85, and the projection 82 of the first valve 61 and the projection 83 of the second valve 62 abut against both side faces of the spacer 81. Thus, the positions of the first valve 61 and the second valve 62 in the outside air introduction duct portion 41 and the inside air introduction duct portion 42 in the valve axis direction are brought into a state of being regulated to planned positions.

Figure 18E:
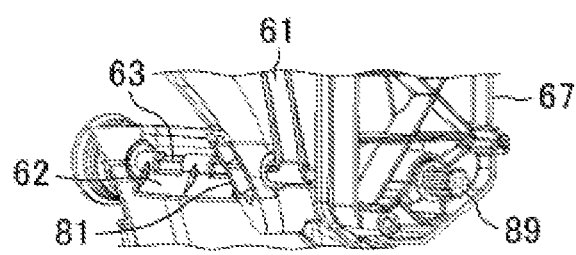

As illustrated in FIG. 18(e), the rotation shaft 63 whose end portion illustrated in FIG. 15 is coupled to a gear 89 is inserted into the fitting portions 73 and 74 of the first valve 61 and the fitting portions 75 to 77 of the second valve 62 from outside the outside air introduction duct portion 41 via the bush 72 of the shaft support portion 65. The gear 89 is provided with a stopper 90 illustrated in FIG. 15, and the stopper 90 abuts against the second duct member 11B, so that the rotation shaft 63 is positioned in the axis direction.

Thereafter, the first duct member 11A and the second duct member 11B are welded together. Then, mounting of a cap 91 illustrated in FIG. 15, the actuator 64, and a bell mouth 92 is performed. That is, the cap 91 is fitted to the shaft support portion 66 on the inside air introduction duct portion 42 side from outside. A gear coupled to an output shaft of the actuator 64 meshes with the gear 89 of the rotation shaft 63, and the actuator 64 is mounted on the actuator support portion 67 on the second duct member 11B side. The bell mouth 92 is fitted to the inside air inlet 45 of the inside air introduction duct portion 42.

Note that the cap 91 and the actuator 64 may be first mounted on the second duct member 11B and then the first duct member 11A and the second duct member 11B may be welded together.

Advantages of the Embodiment (Introduction of Air into Engine Combustion Chamber)

According to the embodiment, the first valve 61 and the second valve 62 are operated by the actuator 64 illustrated in FIG. 13, so that switching can be made between the outside air introduction state in which the outside air introduction passage 55 of the intake duct 11 is open and the inside air introduction passage 56 is closed, and the inside air introduction state in which the outside air introduction passage 55 is closed and the inside air introduction passage 56 is open.

In the outside air introduction state, the air outside the engine room 1 illustrated in FIG. 1 passes through the outside air introduction passage 55 illustrated in FIG. 13 and the like from the outside air inlet 44 of the intake duct 11 and enters the air cleaner 12, and the outside air is introduced into the combustion chamber of the engine 2. In the inside air introduction state, the air inside the engine room 1 passes through the inside air introduction passage 56 from the inside air inlet 45 of the intake duct 11 and enters the air cleaner 12, and high temperature inside air in the engine room 1 is introduced into the combustion chamber of the engine 2.

The inside air introduction state will be described. Air around the engine 2 is warmed by the heat dissipated from the engine 2 and rises, and the air enters the inside of the heat storage cover 21. The heat storage cover 21 blocks the upward (bonnet 3 side) heat dissipation, so that the heat dissipated from the engine 2 is stored inside the heat storage cover 21 through the medium of air. As a result, the temperature of air inside the heat storage cover 21 or below the heat storage cover 21 becomes high.

The inside air inlet 45 of the intake duct 11 faces the inside of the heat storage cover 21 from the bottom, so that the high temperature air obtained by the heat storage cover 21 is brought into the inside air introduction passage 56 of the intake duct 11. Accordingly, the high temperature air is introduced into the combustion chamber of the engine 2 through the air cleaner 12, so that, for example, even when a large amount of air is required as in a lean combustion, a decrease in temperature of the combustion chamber is suppressed, which is advantageous in securing combustion stability of the engine 2.

In the embodiment, the radiator 6 illustrated in FIG. 1 serves to prevent heat dissipation from the engine 2 to the front side, and waste heat released from the radiator 6 (heat taken from the cooling water by heat exchange) is supplied to the engine 2 side by the radiator fan 8. Thus, the temperature of air between the engine 2 and the radiator 6 becomes high. Furthermore, an escape of the heat to the rear side and lateral side of the engine 2 is suppressed by the rear face cover portion 23 and the side face cover portions 24 and 25 in the heat storage cover 21, so that the high temperature air is easily stored between the engine 2 and the radiator 6 in front of the engine 2.

Thus, as illustrated in FIG. 2, the inside air inlet 45 is disposed between the engine 2 and the radiator 6, so that it is advantageous in increasing the temperature of the air to be brought into the intake duct 11. Furthermore, during the inside air introduction state, ventilation to the radiator 6 is blocked by the grille shutter 7 illustrated in FIG. 1, so that a thermal insulating property on the radiator side of the engine 2 is increased, which is advantageous in introducing the high temperature air into the combustion chamber.

Note that the invention according to introduction of air into an engine combustion chamber is a technique useful for suppressing a decrease in temperature of the combustion chamber and is applicable not only to a lean combustion mode but also to a combustion mode in the vicinity of a so-called theoretical air-fuel ratio.

Furthermore, although the whole of an opening of the inside air inlet 45 of the embodiment faces the inside of the heat storage cover 21 from the bottom, a part of the opening may protrude outside the heat storage cover 21. The temperature of air becomes high in the vicinity of the heat storage cover 21 due to influence of the heat storage cover 21, so that, even in a case where a part of the inside air inlet 45 protrudes outside the heat storage cover 21 and air outside the heat storage cover 21 is partially brought into the intake duct 11, the high temperature air can be introduced into the engine combustion chamber.

(Layout of Intake Duct and the like)

According to the embodiment, as illustrated in FIG. 2, in the front intake and rear exhaust engine 2, the inside air inlet 45 is disposed on the front side of the engine 2, so that the inside air introduction passage 56 from the inside air inlet 45 to the air cleaner 12 does not become long, which is advantageous in introducing the high temperature air into the combustion chamber and also facilitates the layout of the intake duct 11.

As illustrated in FIGS. 6 to 8, the intake duct 11 is continuous to the side edge on the front side of the right-side face cover portion 24, so that the intake duct 11 approaches the engine 2 as compared with a case where the intake duct 11 is disposed outside the side face cover portion 24. This prevents an increase in a space occupied by, in the engine room 1, the heat storage cover 21 and air intake system components including the intake duct 11, facilitating the layouts of the heat storage cover 21 and the air intake system components in the engine room 1.

Furthermore, the intake duct 11 has a function of covering the engine 2 from the right side, so that the right-side face cover portion 24 can be made small accordingly. Similarly, regarding the left-side face cover portion 25, the engine mount 38 has a function of covering the engine 2 from the left side, so that the left-side face cover portion 25 can be made small accordingly.

By the shortening of the inside air introduction passage 56 and the downsizing of the side face cover portions 24 and 25, which are described above, the device is advantageously reduced in weight.

The intake duct 11 and the right-side face cover portion 24 are coupled together by the clip 35 (fastening member), so that the coupling is facilitated and the intake duct 11 can be used for support of the right-side face cover portion 24, which is advantageous in reducing the number of components and enhancing mounting stability of the right-side face cover portion 24.

As illustrated in FIG. 9 and the like, the inside air inlet 45 of the intake duct 11 is open upward, so that foreign matter entering the engine room 1 from the horizontal direction or the lower side is less likely to enter the inside air inlet 45, preventing damage to the passage switching mechanism including the second valve 62 of the intake duct 11. In particular, in the embodiment, as illustrated in FIG. 2, the inside air inlet 45 is covered with the heat storage cover 21 from the top, so that it is advantageous in terms of entry of foreign matter.

On the other hand, while the inside air inlet 45 of the inside air introduction duct portion 42 is open upward, as illustrated in FIGS. 11 and 12, the duct wall 41a of the outside air introduction duct portion 41 is across above the inside air inlet 45, and in addition, the projection portion 51 bulges above the inside air inlet 45. That is, the upper side of the inside air inlet 45 is covered not only with the duct wall 41a of the outside air introduction duct portion 41 but also with the projection portion 51. Accordingly, if the heat storage cover 21 is removed in maintenance or the like, foreign matter such as a bolt is blocked by the duct wall 41a of the outside air introduction duct portion 41 and the projection portion 51 and thus is prevented from entering the inside air inlet 45.

Furthermore, the passage switching mechanism composed of the valves 61 and 62 and the like is provided inside the intake duct 11. The passage switching mechanism, in particular, the second valve 62, might be damaged by foreign matter entering the inside of the intake duct 11 from the inside air inlet 45. Accordingly, the upper side of the inside air inlet 45 is covered with the outside air introduction duct portion 41 so as to prevent entry of foreign matter into the inside air inlet 45, thereby preventing damage to the passage switching mechanism inside the intake duct 11 (in particular, the second valve 62) due to entry of foreign matter into the inside of the intake duct 11.

(Passage Switching Mechanism)

While the intake duct 11 is formed by welding of the first duct member 11A and the second duct member 11B, as illustrated in FIG. 13, a structure is adopted in which the shaft support portions 65 and 66 supporting the rotation shaft 63 of the passage switching mechanism, and the actuator support portion 67 supporting the actuator 64 are provided in the second duct member 11B and in which this rotation shaft 63 and this actuator 64 are supported by the second duct member 11B alone. Accordingly, if, due to welding of both duct members 11A and 11B, some deformation occurs in the mating portion, its influence on the support of the rotation shaft 63 and the actuator 64 is small. This prevents the occurrence of a malfunction of the passage switching mechanism.

As illustrated in FIGS. 15 to 17, when the fitting portion 74 of the first valve 61 and the fitting portion 75 of the second valve 62 which form the passage switching mechanism are engaged at their engagement portions 78 and 79, these both valves 61 and 62 are relatively positioned in the valve rotation direction. This facilitates the angle setting of both valves 61 and 62 in the valve rotation direction when both valves 61 and 62 are assembled to the rotation shaft 63.

Furthermore, the relative position between both valves 61 and 62 in the valve axis direction is regulated by engagement of the projections 82 and 83 provided in the fitting portions 74 and 75 of both valves 61 and 62 with the spacer 81. Accordingly, the positions of both valves 61 and 62 in the respective valve disposition portions in the valve axis direction can be regulated only by, as described above, mounting the spacer 81 on the second duct member 11B in a state in which both valves 61 and 62 are engaged at the engagement portions 78 and 79.

As described above, according to the embodiment, by the simple configuration in which the engagement portions 78 and 79 and the projections 82 and 83 are provided in the fitting portions 74 and 75 of both valves 61 and 62 and in which the spacer 81 to be mounted on the second duct member 11B is provided, it is advantageous in assembling both valves 61 and 62 to the respective valve disposition portions with high accuracy, and it is advantageous in preventing malfunctions of the valves 61 and 62.

REFERENCE CHARACTERS LIST 1 engine room
2 engine
3 bonnet
4 cylinder block
5 oil pan
6 radiator
7 grille shutter 8 radiator fan
11 intake duct
11A first duct member
11B second duct member
12 air cleaner
21 heat storage cover
22 top face cover portion
23 rear face cover portion
24 right-side face cover portion
25 left-side face cover portion
35 clip (fastening member)
41 outside air introduction duct portion
41a duct wall
42 inside air introduction duct portion
43 downstream duct portion
44 outside air inlet
45 inside air inlet
51 projection portion
55 outside air introduction passage
56 inside air introduction passage
57 downstream introduction passage
61 first valve
62 second valve
63 rotation shaft
64 actuator
73 to 77 fitting portion
78, 79 engagement portion
81 spacer

The invention claimed is:

1. An air intake device for an engine, comprising:
a cover provided inside an engine room and covering the engine; and
an intake duct for introducing fresh air outside the engine room into a combustion chamber of the engine, wherein
the cover comprises a top face cover portion covering the engine from above, and a side face cover portion covering the engine from a lateral side,
the intake duct is disposed so as to be continuous to a side edge of the side face cover portion such that the intake duct covers the engine from the lateral side together with the side face cover portion,
the intake duct comprises an outside air introduction duct portion for introducing outside air from outside the engine room into the combustion chamber, and an inside air introduction duct portion for introducing inside air from inside the engine room into the combustion chamber,
the intake duct is configured as a composite duct in which the outside air introduction duct portion and the inside air introduction duct portion are connected to a single downstream duct portion, the single downstream duct portion having a downstream end connected to an air cleaner,
the engine room is provided in a front portion of a vehicle,
the air cleaner is disposed on a right outer side of the cover as viewed from a vehicle front side, and
the intake duct is disposed on an outside of the cover and on a front side of the air cleaner, and covers the engine from a right side.

2. The air intake device for an engine according to claim 1, wherein
the engine is a front intake and rear exhaust engine, and
the intake duct is disposed so as to be continuous to a side edge on a front side of the side face cover portion.

3. The air intake device for an engine according to claim 2, wherein the intake duct and the side face cover portion are coupled together by a fastening member.

4. The air intake device for an engine according to claim 3, wherein the fastening member is a clip having a retainer.

5. The air intake device for an engine according to claim 1, wherein
the outside air introduction duct portion has an upstream end that is provided with an outside air inlet open forward and having a horizontally long rectangular shape,
the inside air introduction duct portion has an upstream end that is provided with an inside air inlet open upward and having a horizontally long rectangular shape, and
the downstream duct portion has a downstream end having a connection port open rearward and connected to the air cleaner.

6. The air intake device for an engine according to claim 1, wherein
the outside air introduction duct portion, at a higher position than the inside air inlet of the inside air introduction duct portion, has a duct wall curved toward the inside air introduction duct portion side and extending forward diagonally across above the inside air inlet.

7. The air intake device for an engine according to claim 4, wherein
the side face cover portion comprises a right-side face cover portion covering the engine from the right side,
the intake duct comprises a protrusion protruding rearward and extending in an up-down direction,
the right-side face cover portion comprises a mounting piece protruding forward relative to an upper end of a front end edge of the right-side face cover portion, and
the mounting piece is fixed to an upper end of the protrusion of the intake duct by a clip having a retaining function as a fastening member.

8. An air intake device for an engine, having a cover provided inside an engine room and covering the engine, and an intake duct for introducing fresh air outside the engine room into a combustion chamber of the engine, wherein
the cover comprises a top face cover portion covering the engine from above, and a side face cover portion covering the engine from a lateral side,
the intake duct is disposed so as to be continuous to a side edge of the side face cover portion such that the intake duct covers the engine from the lateral side together with the side face cover portion,
fresh air is introduced from the intake duct to the engine through an air cleaner,
a part of the top face cover portion is placed on the side face cover portion via a seal,
an intake pipe extends toward the engine from the air cleaner,
at a lower edge of the part of the top face cover portion and an upper edge of the side face cover portion, a cutout is formed, and
the intake pipe, which extends toward the engine from the air cleaner, passes through the cutout.

9. The air intake device for an engine according to claim 8, wherein the intake pipe is a flexible pipe.

* * * * *